(12) United States Patent
Kosaka

(10) Patent No.: US 6,281,925 B1
(45) Date of Patent: Aug. 28, 2001

(54) VIDEO TELEPHONE DEVICE HAVING AUTOMATIC SOUND LEVEL SETTING ALONG WITH OPERATION MODE SWITCHING

(75) Inventor: Akio Kosaka, Chiryu (JP)

(73) Assignee: Denso Corporation, Aichi-Pref (JP)

( * ) Notice: Subject to any disclaimer, the term of this patent is extended or adjusted under 35 U.S.C. 154(b) by 0 days.

(21) Appl. No.: 09/368,545

(22) Filed: Aug. 4, 1999

(30) Foreign Application Priority Data

Oct. 14, 1998 (JP) .................................................. 10-292079

(51) Int. Cl.[7] ...................................................... H04N 7/14
(52) U.S. Cl. .................................... 348/14.02; 348/14.01; 455/566
(58) Field of Search .................... 348/14, 15; 379/93.21, 379/93.17, 390; 381/107, 108, 306, 333; 455/566, 556

(56) References Cited

U.S. PATENT DOCUMENTS 5,491,507   2/1996   Umezawa et al. .
6,073,033 * 6/2000   Campo ................................. 455/566

FOREIGN PATENT DOCUMENTS

| 404178055A | * | 6/1992 | (JP) | ................................. H04M/1/60 |
| 5-64181 | | 3/1993 | (JP) . | |
| 405327844A | * | 12/1993 | (JP) | ................................. H04M/1/05 |
| 408088841A | * | 4/1996 | (JP) | ................................. H04N/7/14 |
| 408140143A | * | 4/1996 | (JP) | ................................. H04N/7/38 |
| 409149186A | * | 6/1997 | (JP) | ................................. H04N/1/00 |

* cited by examiner

Primary Examiner—Curtis Kuntz
Assistant Examiner—Melur Ramakrishnaiah
(74) Attorney, Agent, or Firm—Fish & Richardson PC

(57) ABSTRACT

A cellular video telephone terminal is capable of switching its operation mode between a voice communication and a voice and image communication in response to a manual operation on a key. A control unit checks whether the key is operated to effect the voice and image communication. The control unit sets volumes of a speaker and a microphone to low levels in the voice communication mode. The control unit sets the volumes of the same to high levels in the voice and image communication mode to enable hand-free operation.

7 Claims, 2 Drawing Sheets

VIDEO TELEPHONE DEVICE HAVING AUTOMATIC SOUND LEVEL SETTING ALONG WITH OPERATION MODE SWITCHING

CROSS REFERENCE TO RELATED APPLICATION

This application relates to and incorporates herein by reference Japanese Patent Applications No. 10-292079 filed on Oct. 14, 1998.

BACKGROUND OF THE INVENTION

1. Field of the Invention

The present invention relates to a video telephone device, which is capable of voice communication and image communication.

2. Related Art

In various wire type video telephone devices, a hand set (receiver) is provided to enable voice communication in both cases that only voice communication is carried out and that both voice communication and image communication are carried out.

Wireless or radio type video telephone devices are proposed recently as cellular terminals. Those terminals use CDMA (code-divided multiple access) processing to communicate both voice and image at the same time.

If a hand set having a television function (image display) is attached to a normal cellular phone terminal, which communicates only voice, the size of the cellular phone terminal becomes large-sized and heavier. For improving portability of the cellular terminal, a speaker, microphone, display and camera constituting the hand set are desired to be integrated with a radio communication unit into a small light unit.

In this instance, the cellular video telephone terminal should be held closely to the user's ear not to disturb other people in the crowd, although the user cannot view an opponent user on the display. On the other hand, the cellular video telephone terminal may be held a little away from the user to communicate with the opponent user while viewing the opponent user on the display in the non-crowded place. Thus, it is desired that the cellular video telephone terminal operates in the most appropriate mode depending on circumstances.

SUMMARY OF THE INVENTION

It is therefore an object of the present invention to provide a video telephone device operable with different sound level corresponding to different operation modes depending on user's switching of operation modes.

According to the present invention, a video telephone device is capable of switching its operation mode between a voice communication and a voice and image communication in response to a manual operation. A control unit automatically changes at least the sound level of a speaker when the operation mode is switched between the voice communication mode and the voice and image communication mode.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with reference to an embodiment. The embodiment is directed to a cellular video telephone, which communicates both voice and dynamic image. In the embodiment, a communication or access may be carried out in the CDMA (code-divided multiple access) processing using divided codes.

Figure 1:
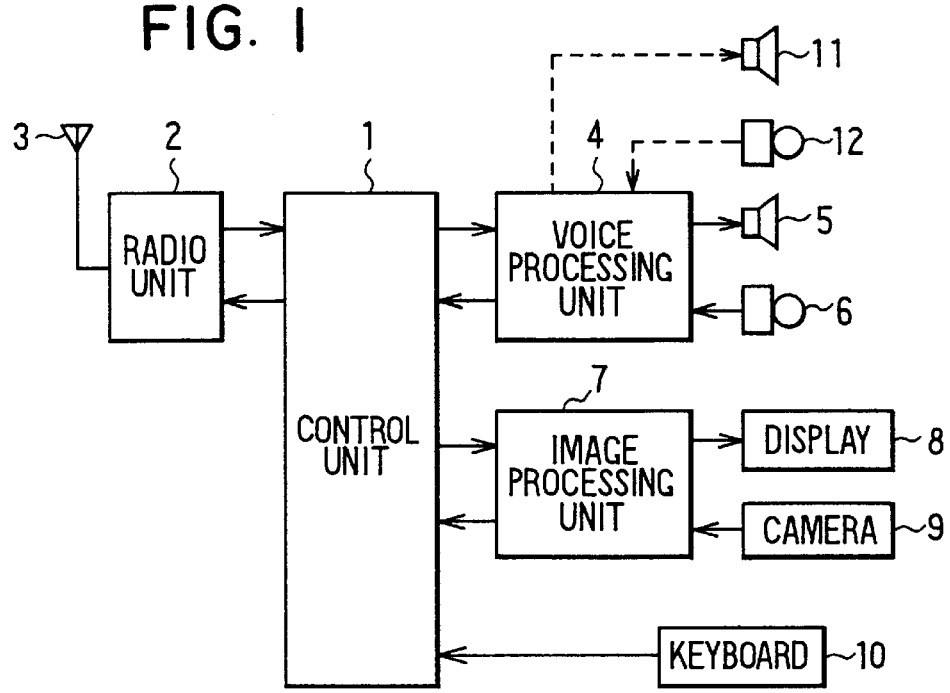
FIG. 1 is a block diagram showing a cellular video telephone terminal according to a first embodiment of the present invention.
Figure 2:
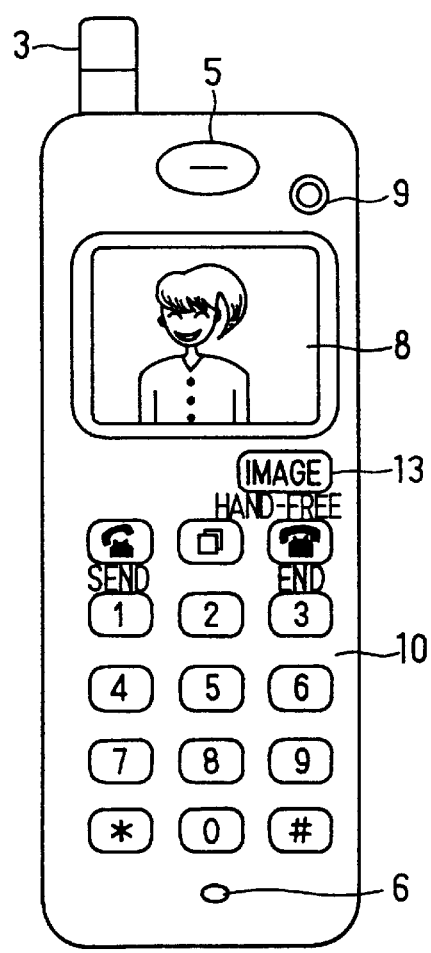
FIG. 2 is a schematic view showing an outlook of the cellular video telephone terminal shown in FIG. 1.

Referring first to FIG. 1, a cellular video telephone terminal comprises a control unit 1, which includes a programmed microcomputer and is connected to a radio unit (radio transmitter/receiver) 2 connected to an antenna 3 through its transmitter/receiver terminal.

The control unit 1 is connected to a voice processing unit 4, which is connected to a speaker 5 for outputting sound messages and a microphone 6 for inputting sounds. The control unit 1 is connected to an image processing unit 7, which is connected to a display 8 for displaying dynamic picture images of opponent users and a camera 9 for inputting dynamic picture images of a user. The voice processing unit 4 is connectable through a coaxial cable to an earphone 11 and an external microphone 12, which may be integrated into a single earphone-microphone unit. The control unit 1 is further connected to a keyboard unit 10, which has a number of key buttons labeled as SEND, END, IMAGE, numeric figures 0–9 and the like.

The control unit 1, particularly the microprocessor therein, is programmed to effectuate the following operation in the generally known manner.

That is, when a user of the cellular video telephone presses a POWER button on the keyboard unit 10, the video telephone is enabled to operate with the electric power supplied from a built-in battery. The antenna 3 receives radio signals from nearby base stations and transmits a signal having the highest electric field to the radio unit 2 as a high frequency signal. The radio unit 2 responsively transmits the received signal to the control unit 1 after converting it into a base band signal by a high frequency amplifier, a receiver mixer and the like. The control unit 1 demodulates the base band signal to provide a report information included in the received radio signal. If registration of location is required in the report information, the control unit 1 converts a location registration information into a transmission base band signal to be transmitted to the radio unit 2 in return. The radio unit 2 converts the transmission base band signal into a high frequency signal by a transmitter mixer and transmits it as a radio signal from the antenna 3 through a power amplifier and the like. Thus, the cellular video telephone, particularly the control unit 1, is put in a wait condition.

In issuing calls, the user (caller) inputs a phone number of an opponent user (call-receiver) through key operations on the keyboard unit 10. The control unit 1 responsively causes the image processing unit 7 to display the inputted phone number on the display 8. When the user presses the SEND button on the keyboard unit 10 after checking the displayed phone number to effectuate calling, the user is enabled to start communication with the opponent user. Voice of the user is converted into an electric signal by the microphone 6 and is applied to the voice processing unit 4 as a voice signal. The voice processing unit 4, after amplifying and converting the voice signal into a corresponding digital signal, compresses the converted voice signal into a low bit rate signal by its voice coding circuit. This low bit rate voice data signal is applied to the control unit 1.

When the user presses the IMAGE button on the keyboard unit 10, the image of the user is converted into an image signal by the camera 9 to be applied to the image processing unit 7 as long as a high speed data transmission in excess of 64 k bps is possible due to good radio transmission condition. The image processing unit 7, after amplifying and converting the image signal into a corresponding digital signal, compresses the converted image signal into a low bit rate signal by its image coding circuit. This low bit rate image data signal is applied to the control unit 1.

The control unit 1 subjects those voice data signal and the image data signal into the code-divided multiplex access (CDMA) processing and digital modulation to transmit the resulting signal to the radio unit 2 as a base band signal.

The radio unit 2 responsively converts this base band signal into a high frequency signal and transmits it from the antenna 3 to the base station after power amplification.

When the antenna 3 receives a radio signal from the base station in return, it transmits the received radio signal to the radio unit 2 as a high frequency signal. The radio unit 2 converts this high frequency signal into a base band signal to be transmitted to the control unit 1. The control unit 1 demodulates and converts the base band signal into a voice data signal and an image data signal by subjecting it to the CDMA processing. Those voice data signal and the image data signal are applied to the voice processing unit 4 and the image processing unit 7, respectively.

The voice processing unit 4 expands the received voice data signal by a voice demodulation circuit into a corresponding digital voice signal, which is in turn converted into an analog voice signal to drive the speaker for providing a voice message. The image processing unit 7 similarly expands the received image data signal by an image demodulation circuit into a corresponding digital image signal, which drives the display 8 to provide an image of an opponent user or the like on the display 8.

In receiving calls, a call message is transmitted from the base station to be received by the antenna 3 under the wait condition. The radio unit 2 converts a received radio signal into a base band signal to be transmitted to the control unit 1. The control unit 1 processes this base band signal and recognizes an arrival of message to effectuate a call-responsive operation. Thus, when the message indicative of the call from the opponent user is received, the control unit 1 informs the user of the arrival of the call by driving a ringer or a vibrator. Then, generally the similar operation as described above with respect to the call-issuing operation is carried out, when the user presses the SEND button on the keyboard unit 10.

Figure 3:
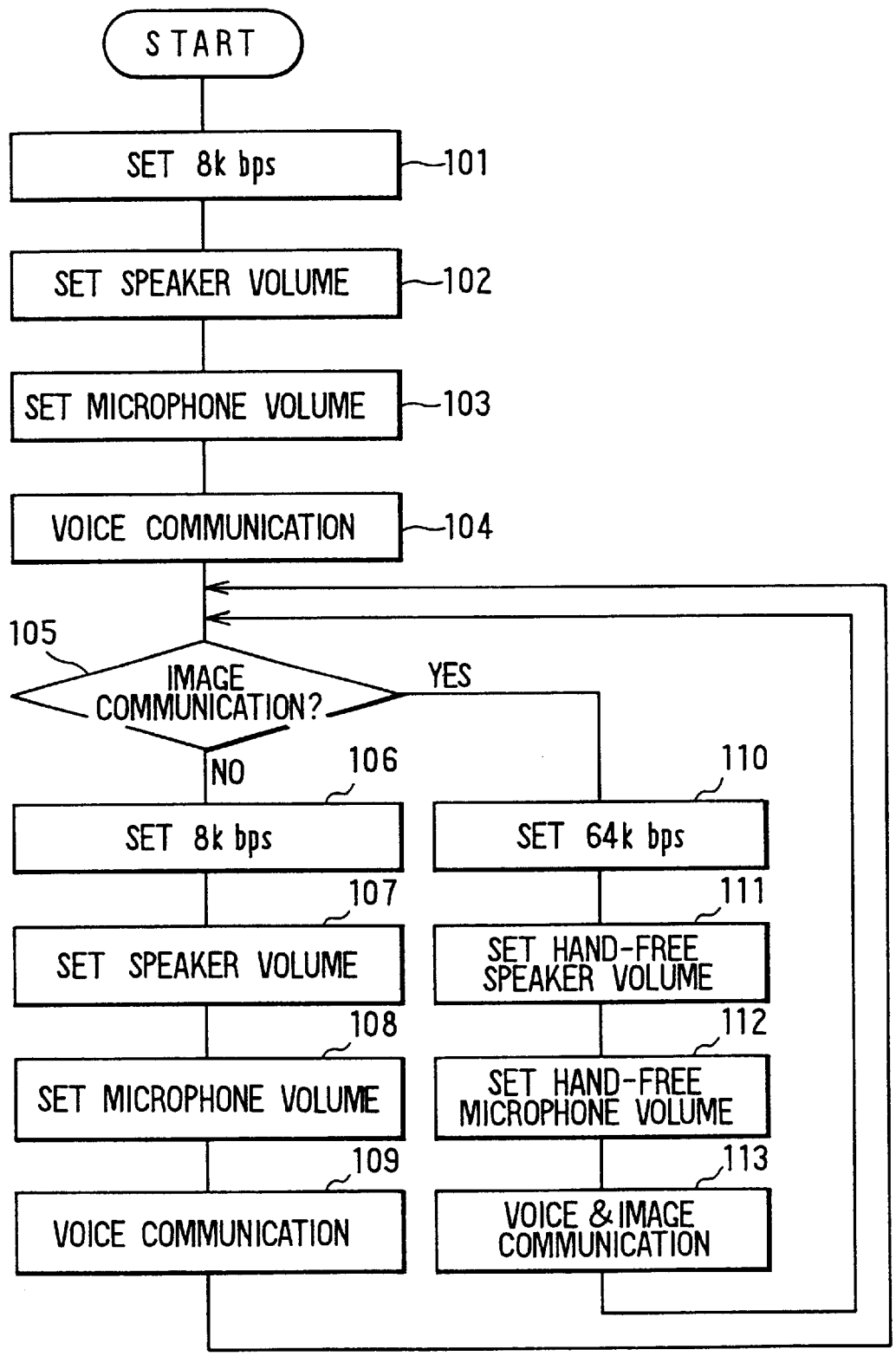
FIG. 3 is a flow diagram showing an operation mode control routine of the cellular video telephone terminal shown in FIGS. 1 and 2.

More specifically, the control unit 1, particularly the microcomputer, is so programmed that the video telephone operates based on the control routine shown in FIG. 3.

The control unit 1 first sets at step 101 a communication speed to a lower value, 8 k bps. Then, the control unit 1 sets the volume of the speaker 5 and the volume of the microphone 6 to appropriate levels at steps 102 and 103, respectively. Here, the volume of the speaker is set to a lower level suitable for using the speaker 5 near the user's ear, and the volume of the microphone 6 is set to a lower level suitable for using the microphone 6 near the user's mouth. This volume setting may be effected by decreasing the amplification gains of amplifiers in the voice processing unit 4.

The control unit 1 causes at step 104 the voice processing unit 4 to reproduce vocal sounds of the opponent user from the speaker 5 and to input vocal sounds of the user from the microphone 6, so that voice communication mode is set up. The control unit 1 disables the image processing unit 7, so that the image communication mode is cancelled at this moment irrespective of receiving the images from the opponent user side. This is for the reason that, as described later, the volume of the speaker is automatically set to a larger value, which will disturb nearby persons and unveil provacy of the opponent user, when both of the voice communication and the image communication are carried out, that is, when the hand-free condition is set. Thus, the user is enabled to determine at the time of receiving the call whether the video telephone can be used under the hand-free condition.

The control unit 1 then determines at step 105 whether the image communication is requested, that is, whether the IMAGE button 13 on the keyboard unit 10 is turned on or pressed by the user. If the image communication is not requested (NO), the control unit 1 executes steps 106 to 109, which are the same as steps 101 to 104, so that only the voice communication is allowed to be continued. If the image communication is requested (YES), the control unit 1 executes steps 110 to 113 to enable both of the voice communication and the image communication.

That is, at step 110, the control unit 1 sets the communication speed to the higher value 64 k bps. Then, the control unit 1 sets the volume of the speaker 5 and the volume of the microphone 6 to appropriate levels at steps 111 and 112, respectively, suitable for using the video telephone away from the user (hand-free mode). Here, the volume of the speaker 5 is set to a higher level suitable for using the speaker 5 away from the user's ear, and the volume of the microphone 6 is set to a higher level suitable for using the microphone 6 away from the user's mouth. This volume setting may be effected by increasing the amplification gains of the amplifiers in the voice processing unit 4.

The control unit 1 now operates at step 113 the image processing unit 7 as well as the voice processing unit 4, so that both of the voice communication and the image communication may be carried out. In addition to the above operation of the voice processing unit 4, the image processing unit 7 causes the display 8 to provide the dynamic image of the opponent user and causes the camera 9 to input the dynamic images of the user to be transmitted to the opponent user.

Thus, according to the present embodiment, the operation modes can be switched between only voice communication (normal cellular phone mode) and both of voice and image communication (hand-free mode) by the user, who actuates or deactuates the IMAGE button 13 on the keyboard unit 10. Thus, it becomes possible to use the video telephone for voice communication with low output sound level in the crowded place, and to use it for both voice and image communication with high output sound level and high input sound level in the non-crowded place. In the voice and image communication mode, the user can communicate with the opponent user while watching the images of the opponent user on the display 8, that is, while not holding but placing it away, for example, on a desk or the like.

Further, no image of the opponent user can be provided on the display 8 even under the voice and image communication mode, if the opponent telephone is not a video telephone type or not set to the voice and image communication mode.

However, because the voice communication mode can be switched to the voice and image communication mode by the IMAGE button 13, the output and input sound levels are raised so that the video telephone can be used under the hand-free condition. As the hand-free condition for both of the voice communication mode and the voice and image communication mode by the single IMAGE button 13, operability is improved. Further, as the IMAGE button 13 can be used in common for setting and resetting the image communication and for switching the operation modes, the number of buttons and hence the area for the button arrangement on the keyboard unit 10 need not be increased. As a result, the video telephone terminal can be sized small and light-weight.

It is preferred in the above embodiment that, as long as the earphone 11 and the external microphone 12 are used for communication, the amplification gains of the amplifiers in the voice processing unit 4 are held unchanged even if the operation mode is switched to the voice and image communication mode by the IMAGE button 13. In this instance, as the output sound level and the input sound level are not increased even when the operation mode is switched from the voice communication to the voice and image communication, the user can communicate with the opponent user while watching the image of the opponent user on the display 8 and without disturbing other people around the user.

The present embodiment should not be limited to the mobile radio cellular type but may be modified to the wire desk-top type for home or business use. Further, the present embodiment may also be modified such that a message indicative of the arrival of a call including images is provided on the display 8 when the video telephone is called from the opponent video telephone. In this instance, the call from the opponent user can be received by turning on the IMAGE button 13.

Other modifications and alterations are also possible without departing from the spirit of the invention.

I claim:

1. A mobile video telephone comprising:
   voice communication means for effecting voice communication;
   image communication means for effecting image communication;
   mode switching means for switching between the voice communication through the voice communication means and the voice and image communication through the voice communication means and the image communication means in response to an external operation;
   control means for automatically setting an amplification of a received voice signal to a higher gain in the voice and image communication mode than in the voice communication mode;
   determining means for determining whether an image signal is being received from an opponent when the mode switching means is operated to effect the voice and image communication,
   wherein the control means enables the image communication means to effect a display of a received image and sets the amplification of the received voice signal to the higher gain, when the determining means determines a receipt of the image signal, and
   wherein the control means disables the image communication means to effect a display of image and sets the amplification of the received voice signal to the lower gain, when the determining means determines non-receipt of the image signal.

2. A mobile video telephone of claim 1, wherein the control means sets an amplification of a transmission voice signal to a higher gain in the voice and image communication mode than in the voice communication mode.

3. A mobile video telephone of claim 2, wherein the control means maintains the amplification gains of the received voice signal and the received image signal unchanged between the voice communication mode and the voice and image communication mode irrespective of operation of the mode switching means, when an earphone-microphone is used.

4. A mobile video telephone of claim 1, further comprising:
   a keyboard unit having a plurality of keys, one of which is used as the mode switching means; and
   the key is also operable to effect a function other than switching the modes.

5. A mobile video telephone of claim 3, wherein the key is arranged as a hand-free switch to set the amplification gain of the received voice signal to the higher value when operated in the course of receiving only a voice signal than before.

6. A mobile video telephone of claim 1, wherein the control means maintains the amplification gain of the received voice signal unchanged between the voice communication mode and the voice and image communication mode irrespective of operation of the mode switching means, when an earphone is used.

7. A mobile video telephone of claim 1, further comprising radio means for transmitting and receiving radio signals for the voice communication and the voice and image communication.

* * * * *